United States Patent
Duong et al.

(10) Patent No.: US 9,800,433 B2
(45) Date of Patent: Oct. 24, 2017

(54) METHOD AND APPARATUS FOR PROVIDING A POINT-TO-POINT CONNECTION OVER A NETWORK

(71) Applicant: AT&T Intellectual Property I, L.P., Atlanta, GA (US)

(72) Inventors: Tuan Duong, Eatontown, NJ (US); Christopher J. Chase, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 124 days.

(21) Appl. No.: 14/971,889

(22) Filed: Dec. 16, 2015

(65) Prior Publication Data

US 2017/0180154 A1    Jun. 22, 2017

(51) Int. Cl.
 *H04L 12/28* (2006.01)
 *H04L 12/46* (2006.01)
 (Continued)

(52) U.S. Cl.
 CPC ...... *H04L 12/4633* (2013.01); *H04L 12/4641* (2013.01); *H04L 45/02* (2013.01)

(58) Field of Classification Search
 None
 See application file for complete search history.

(56) References Cited

U.S. PATENT DOCUMENTS 7,061,921 B1   6/2006   Sheth
7,082,102 B1   7/2006   Wright
(Continued)

FOREIGN PATENT DOCUMENTS

WO    WO 2005/050933    6/2005

OTHER PUBLICATIONS

"Junos® Space Network Activate Release 14.1R2 Release Notes," Juniper, juniper.net, Dec. 5, 2014. http://www.juniper.net/techpubs/en_US/junos-space14.1/information-products/topic-collections/release-notes/js-relnotes-na-14.1R2/junos-space-release-notes-network-activate-14.1R2.pdf Discloses the Junos Space Network Activate Release 14.1R2 and its provisioning capabilities, including "Point-to-point services across networks that use LDP or BGP for signaling in the network core. These services use directed pseudowire virtual circuits across the network to establish point-to-point virtual private networks (VPNs)."

(Continued)

*Primary Examiner* — Eunsook Choi

(57) ABSTRACT

A method and apparatus for providing a point-to-point connection are disclosed. The method queries for a next available label for a first provider edge router and a next available label for a second provider edge router, performs a first configuration at the first provider edge router and a second configuration at the second provider edge router, wherein the performing the first configuration comprises configuring a first interface and configuring a label for using at least one tunnel by a second interface, wherein the performing the second configuration comprises configuring a third interface and configuring a label for using the at least one tunnel by a fourth interface, and performs a first mapping for the first provider edge router from the first interface to the second interface, and a second mapping for the second provider edge router from the third interface to the fourth interface.

20 Claims, 3 Drawing Sheets

(51) Int. Cl.
*H04L 12/751* (2013.01)
*H04L 12/56* (2006.01)

(56) References Cited

U.S. PATENT DOCUMENTS

| | | | |
|---|---|---|---|
| 7,590,760 B1 | 9/2009 | Banks et al. | |
| 7,602,778 B2* | 10/2009 | Guichard | H04L 45/50 370/389 |
| 7,623,449 B2 | 11/2009 | Shabtay | |
| 7,643,409 B2 | 1/2010 | Voit et al. | |
| 7,782,854 B2* | 8/2010 | Sakata | H04L 12/4641 370/392 |
| 7,881,314 B2* | 2/2011 | Regale | H04L 45/50 370/401 |
| 7,936,780 B1* | 5/2011 | Kompella | 370/254 |
| 7,941,512 B2 | 5/2011 | Droms et al. | |
| 8,081,631 B1* | 12/2011 | Chase | H04L 12/2852 370/392 |
| 8,233,479 B2 | 7/2012 | Wijnands et al. | |
| 8,374,082 B2 | 2/2013 | Lange | |
| 8,385,194 B2 | 2/2013 | Lange | |
| 8,441,937 B2* | 5/2013 | Gero | H04L 43/0811 370/236.2 |
| 8,442,030 B2* | 5/2013 | Dennison | H04L 12/4625 370/217 |
| 8,699,499 B2 | 4/2014 | Mulligan et al. | |
| 8,879,383 B1 | 11/2014 | Cirkovic et al. | |
| 8,953,500 B1 | 2/2015 | Shen et al. | |
| 9,049,148 B1 | 6/2015 | Singh | |
| 9,071,514 B1 | 6/2015 | Hegde et al. | |
| 9,100,213 B1 | 8/2015 | Ramanathan et al. | |
| 9,154,316 B2 | 10/2015 | Wijnands et al. | |
| 2008/0095061 A1* | 4/2008 | Hua | H04L 43/0811 370/248 |
| 2009/0296568 A1* | 12/2009 | Kitada | H04L 45/00 370/221 |
| 2010/0061372 A1* | 3/2010 | Seki | H04L 45/50 370/392 |
| 2010/0303081 A1 | 12/2010 | Miyabe | |
| 2014/0098817 A1 | 4/2014 | Aggarwal et al. | |
| 2015/0207724 A1* | 7/2015 | Choudhury | H04L 45/26 370/255 |
| 2017/0099180 A1* | 4/2017 | Singh | H04L 45/02 |

OTHER PUBLICATIONS

Chrissan, Douglas, "Uni-DSL™ One DSL for Universal Service.," White Paper—Texas Instrument, focus.ti.com, Jun. 2004. http://focus.ti.com/pdfs/vf/bband/udsl_whitepaper.pdf Discloses a physical solution to point-to-point communications using DSL.

"MPLS WAN: Technology Design Guide," CISCO, cisco.com, Aug. 2014. http://www.cisco.com/c/dam/en/us/td/docs/solutions/CVD/Aug2014/CVD-MPLSWANDesignGuide-AUG14.pdf Discloses a solution for point-to-point routing configurations in a network; specifically "These EtherChannel links are configured as 802.1Q VLAN trunks, to support both a routed point-to-point link to allow EIGRP routing with the distribution switch".

* cited by examiner

METHOD AND APPARATUS FOR PROVIDING A POINT-TO-POINT CONNECTION OVER A NETWORK

The present disclosure relates to a method and apparatus for providing a point-to-point connection over a network, e.g., between routers in a network of a communications service provider.

BACKGROUND

As Internet usage continues to grow, customers are deploying more and more endpoint devices that attach to various networks. The customer may wish to enable the endpoint devices to communicate with each other. The customer may then subscribe to a service, e.g., a Virtual Local Area Network (VLAN) service, from the network service provider. When an endpoint device is being used to communicate with only one other endpoint device, the customers may benefit from a point-to-point connectivity between the two endpoint devices.

SUMMARY OF THE DISCLOSURE

In one embodiment, the present disclosure teaches a method and apparatus for providing a point-to-point connection over a network, e.g., between routers in a network of a service provider. For example, the method queries a centralized controller for a next available label for a first provider edge router and a next available label for a second provider edge router, wherein a first interface and a second interface are deployed in the first provider edge router, wherein a third interface and a fourth interface are deployed in the second provider edge router, wherein a first customer endpoint device is connected to the first interface, wherein a second customer endpoint device is connected to the third interface, performs a first configuration at the first provider edge router and a second configuration at the second provider edge router, wherein the performing the first configuration comprises configuring the first interface and configuring a virtual routing and forwarding label or a context label for using at least one tunnel by the second interface, wherein packets transmitted from the first customer endpoint device to the second endpoint device traverse the at least one tunnel via the second interface, wherein the performing the second configuration comprises configuring the third interface and configuring a virtual routing and forwarding label or a context label for using at least one tunnel by the fourth interface, wherein packets transmitted from the second customer endpoint device to the first endpoint device traverse at least one tunnel via the fourth interface, and performs a first mapping for the first provider edge router from the first interface to the second interface, and a second mapping for the second provider edge router from the third interface to the fourth interface.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
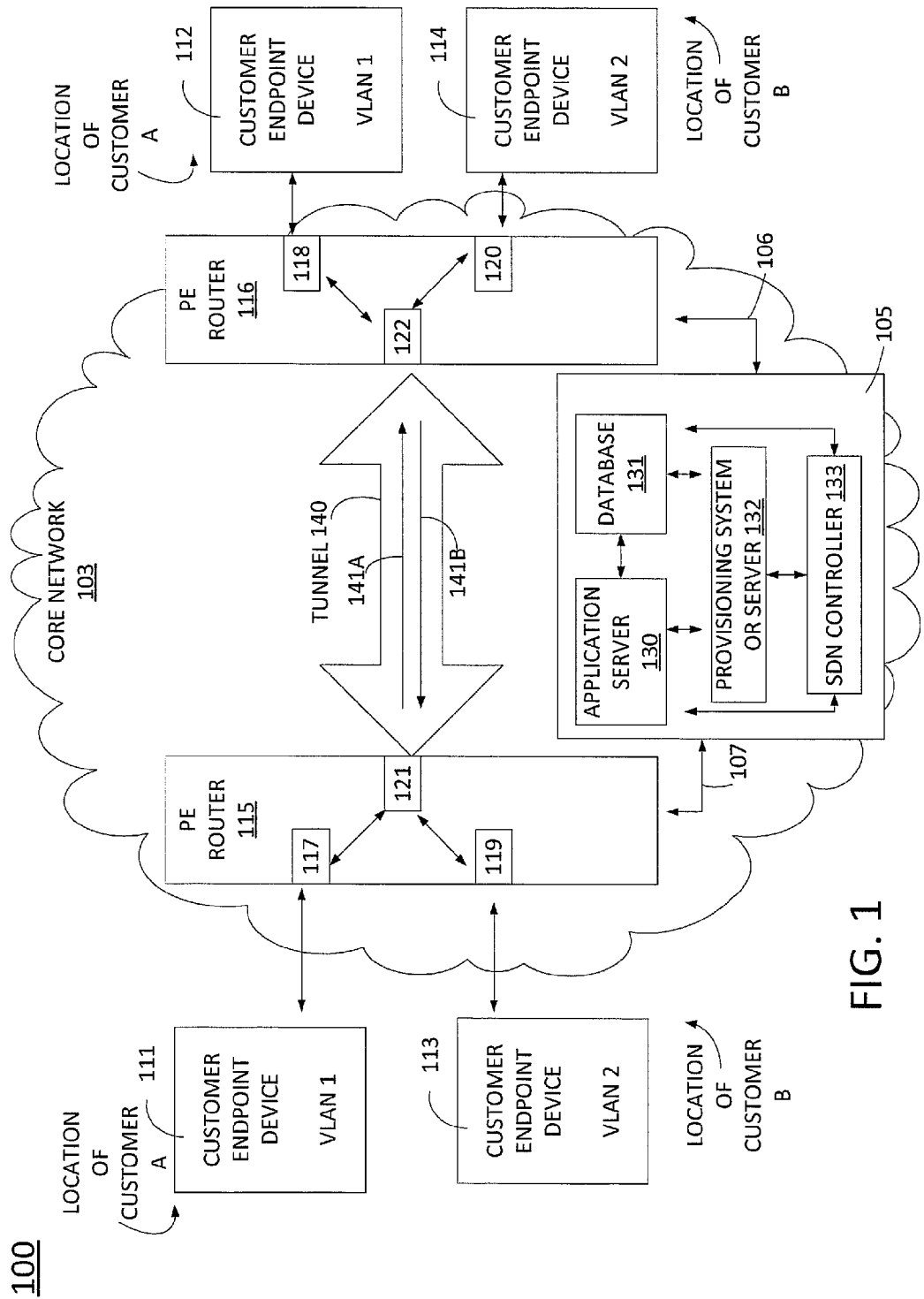
FIG. 1 illustrates an example network related to the present disclosure.

The present disclosure relates to a method and apparatus for providing a point-to-point connection over a network, e.g., between routers of a network of a communications service provider. The teachings of the present disclosure can be applied to any type of wired or wireless communications network.

In order to clearly illustrate the teachings of the current disclosure, the following terminologies will first be described:

Label edge router;
Provider edge router;
Label switching router; and
Resolved tunnel next-hop.

Label Edge Router (LER) refers to an ingress router that first encapsulates a packet into a Multi-Protocol Label Switching (MPLS) label switched path (LSP) or an egress router that removes the encapsulation at the end of the LSP. The LSP is a tunnel between a pair of routers that traverses across an MPLS network. In one embodiment, the tunnel is a unidirectional tunnel. In one embodiment, the tunnel is a bidirectional tunnel.

Provider Edge (PE) router refers to a customer facing router that functions as an LER, e.g., performs label popping and/or imposition. PE routers also have various edge router features for terminating services, e.g., Virtual Local Area Network (VLAN) services.

In a network that routes using IP, each router determines a next-hop bases on an Internet Protocol address lookup in its routing table and forwards the packet accordingly. In an MPLS network, the first router handling the packet performs a lookup, similar to the lookup performed in the IP network. However, the first router of an MPLS network determines a final router's address (not the address of the next router) and a pre-determined path to reach the final router. The first router then applies a label to the packet. Other routers located between the first and the final router use the label for routing without an additional lookup. The final router of the MPLS network then removes the label (i.e., pops the label) and forwards the packet towards the customer site using IP.

Label Switching Router (LSR) refers to a router that perform MPLS switching in the middle of the LSP. A core backbone router that performs only label switching is also referred to as a provider router.

A resolved tunnel next-hop for a PE router identifies an outgoing interface of the PE router to be used by packets traversing a tunnel, and a stack of labels for identifying a path through the network.

One approach to enable connectivity among various locations of customer endpoint devices is using a Border Gateway Protocol (BGP). For each endpoint device, an LER that is local to the endpoint device assigns a label, e.g., a MPLS label, for directing data to and from the endpoint device. The LERs exchange label information over Border Gateway Protocol—Virtual Private LAN (local area network) Service (BGP-VPLS). A customer circuit then becomes active when the label is exchanged among the LERs.

However, as more and more devices, e.g., Internet of Things (IoT) devices, are added to a VLAN, the number of labels to be exchanged grows significantly. The endpoint devices may need to have larger routing tables that include routing information for reaching all endpoint devices of the VLAN. For instance, when an endpoint device is added to an existing VLAN, an LER may assign an MPLS label to the newly added endpoint device and signal the label to other LERs over BGP-VPLS. The other LERs then update their respective routing tables with the label of the newly added endpoint device. However, in some scenarios, an endpoint device may need to communicate with only one other endpoint device and a point-to-point connectivity may suffice. Thus, although the routing table updates at other endpoint devices are performed, these updates of the new entries at these other endpoint devices may never be used. In addition, when all MPLS labels are signaled to all members of the VLAN, each LER will also maintain BGP-VPLS state information. For a connection between two endpoint devices to be maintained, a signaling channel is maintained between the two LERs. If the signaling between the two LERs terminates, the connection also terminates. As can be readily observed, the sharing of all MPLS labels is performed to allow full mesh connectivity among all locations of the VLAN, but such full mesh connectivity incurs a significant processing and overhead cost. Thus, the customer may benefit from a point-to-point connectivity that does not require signaling of all MPLS labels to all members of a VLAN.

In one embodiment, the present disclosure provides to the customer a non-signaled point-to-point connectivity. The non-signaled point-to-point connectivity comprises a connectivity wherein no signaling to the control plane is performed for MPLS labels or virtual route forwarding labels. The method of the present disclosure provides to the customer several advantages.

First, the method does not require knowledge of all MPLS labels for reaching each and every endpoint device in the VLAN. Hence, a large routing table is not needed for communicating in accordance with the teachings of the present disclosure.

Second, the method moves the responsibility of assigning MPLS labels used for context label to carry customer VLANs from the LER to a centralized controller, e.g., a controller for a Software Defined Networking (SDN). For example, the SDN manages the usage of MPLS labels that have been carved out of the total label space in the LER for use by a non-signaled point-to-point service. Note that other protocols that require MPLS labels for other services on the PE will avoid the MPLS range reserved for the non-signaled point-to-point service. In one example, assigning of the MPLS labels by the SDN controller results in the assignment being vendor independent. In other words, the need for a standardized format for signaling the MPLS labels among products from different vendors is then removed. In turn, this allows newer and smaller vendors to enter the market place for routers. The customer benefits from availability of routers from more vendors.

Third, the method removes a requirements on the LERs to maintain BGP-VPLS state information for point-to-point connectivity. Removing the requirements on the LERs to maintain BGP-VPLS state information alleviates the network from a requirement to maintain a signaling channel for maintaining data connectivity. For example, the signaling channel of the present disclosure may be taken down while the data connectivity is maintained.

For an illustrative example, a point-to-point connection may be for providing communication between two VLAN locations of a customer. Nodes 1 and 2 may comprise PEs or LERs serving locations 1 and 2 of the VLAN, respectively. Suppose, the nodes 1 and 2 (PE routers) are from two different vendors, with each node having an MPLS label range that is specified by its own vendor. When the nodes are put into the network, an instantiation of the nodes is created in the network. A record of the instantiation of the nodes is stored. The record is to be used by the SDN controller. For example, the applicable MPLS label ranges for each vendor and/or type of node may be stored in the SDN controller or in a database accessible by the SDN controller.

When a provisioning system queries the SDN controller for a next available label for a node, the SDN controller provides to the provisioning system the next available label for the node. For instance, for each of the nodes 1 and 2, the SDN controller determines the next available MPLS label and sends the label as a response to the query. The provisioning system then configures the interfaces on nodes 1 and 2 in accordance with their respective VLANS. In addition, the provisioning system establishes a tunnel between nodes 1 and 2, using the MPLS labels of nodes 1 and 2 provided to the provisioning system by the SDN controller. Once the interfaces are configured and the tunnel is established, the customer VLAN may be mapped onto the tunnel that has been provisioned.

The provisioning system then provides the resolution of the next hop for each of the nodes 1 and 2. This is the static resolution method. For each node, the resolving of the next hop provides the IP address of the node at the other end of the tunnel, a stack of labels needed to traverse across the network to reach the node at the other end of the tunnel, and an outgoing interface of the node to be used for communicating with the other node at the other end of the tunnel. For example, for node 1, the provisioning system provides to node 1 the IP address of node 2, a stack of labels for traversing the network from node 1 to node 2, and an outgoing interface of node 1 to be used for transmitting to and from node 2. Similarly, for node 2, the provisioning system provides to node 2 the IP address of node 1, a stack of labels for traversing the network from node 2 to node 1, and an outgoing interface of node 2 to be used for transmitting to and from node 1.

FIG. 1 illustrates an example network 100 related to the present disclosure. In one illustrative embodiment, the network 100 comprises customer endpoint devices 111-114 and a core network 103.

In one example, the customer endpoint devices 111-112 and 113-114 may comprise routers of customer A and customer B, respectively. The customers A and B subscribe to VLAN services for connecting their respective endpoint devices over the core network 103. The customer endpoint devices 111 and 113 access services from the core network via a provider edge (PE) router 115. Similarly, the customer endpoint devices 112 and 114 access services from the core network via a PE router 116.

Interfaces 117 and 119 of the PE router 115 are used for transmitting packets to and from customer endpoint devices 111 and 113, respectively. Interfaces 118 and 120 of the PE router 116 are used for transmitting packets to and from customer endpoint devices 112 and 114, respectively. Interface 121 of PE router 115 is the interface used for transmitting packets to and from PE router 116 via tunnel 140. Similarly, interface 122 of PE router 116 is the interface used for transmitting packets to and from PE router 115 via tunnel 140. Point-to-point traffic for both customer A and customer B may be mapped into a same tunnel, e.g., tunnel 140. In one embodiment, separate tunnels may be used for transmission in opposite directions. For example, the tunnel 140 may comprise tunnels 141a and 141b, with each of the tunnels 141a and 141b being used as a unidirectional tunnel.

Figure 3:
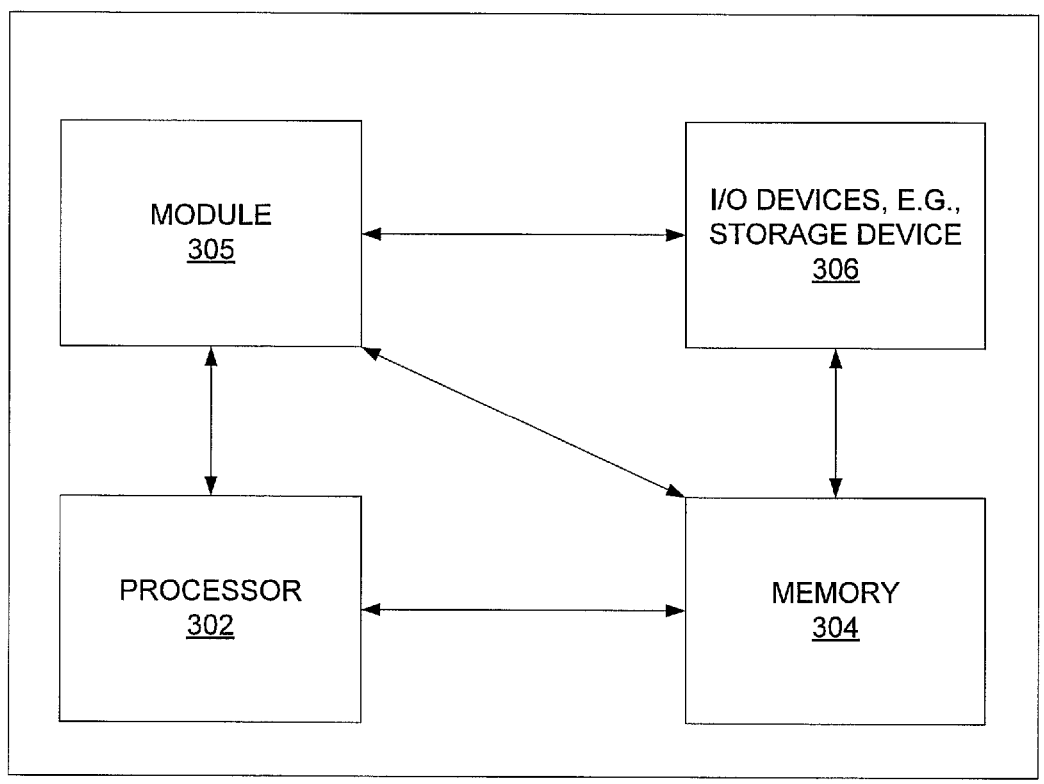
FIG. 3 depicts a high-level block diagram of a computer suitable for use in performing the functions described herein.

In one embodiment, the core network 103 may include a network control system 105, e.g., having an application server (AS) 130, e.g., a database server, a database (DB) 131, a provisioning system or server 132, and an SDN controller 133. For example, the provisioning system 132 may be deployed as a hardware device embodied as a dedicated database server (e.g., the dedicated computer 300 as illustrated in FIG. 3). In one embodiment, the provisioning system 132 is configured to perform the methods and functions described herein (e.g., the method 200 discussed below). In one example, the network control system 105 will have communication channels 106 and 107 to interact with PE routers 115 and 116.

It should be noted that the network 100 may include additional networks and/or elements that are not shown to simplify FIG. 1. For example, the network may include an access network and additional network elements (not shown), such as for example, base stations, border elements, cross-connects (e.g., light guide cross connects), gateways, firewalls, routers, switches, call control elements, various application servers, and the like.

Although the above illustrative examples describe various components for providing a point-to-point connection, the method of the present disclosure may be implemented on any number of systems or processors. As such, the descriptions and the illustrative examples are not intended to be limitations on the present disclosure.

In one embodiment, the SDN controller 133 is used for storing a label range of each router, receiving a request for assigning MPLS labels for non-signaled MPLS for point-to-point connections, assigning MPLS labels to routers in accordance with their respective label ranges, and providing to a provisioning system the MPLS labels that are assigned.

In one embodiment, the database 131 is used for storing various data, e.g., customer service and profiles (e.g., IP addresses), configuration data, etc. In one embodiment, the provisioning system 132 is used for providing a point-to-point connection between routers over a network. For example, the provisioning system 132 may be for: receiving a request for a point-to-point connection, querying the SDN for labels, e.g., next available labels, configuring, for each PE router, a customer facing interface, configuring, for each PE router, a virtual routing or forwarding or context for using a tunnel, and performing, for each PE router, a mapping from the customer facing interface of the PE router to the interface of the PE router connected to the tunnel.

Figure 2:
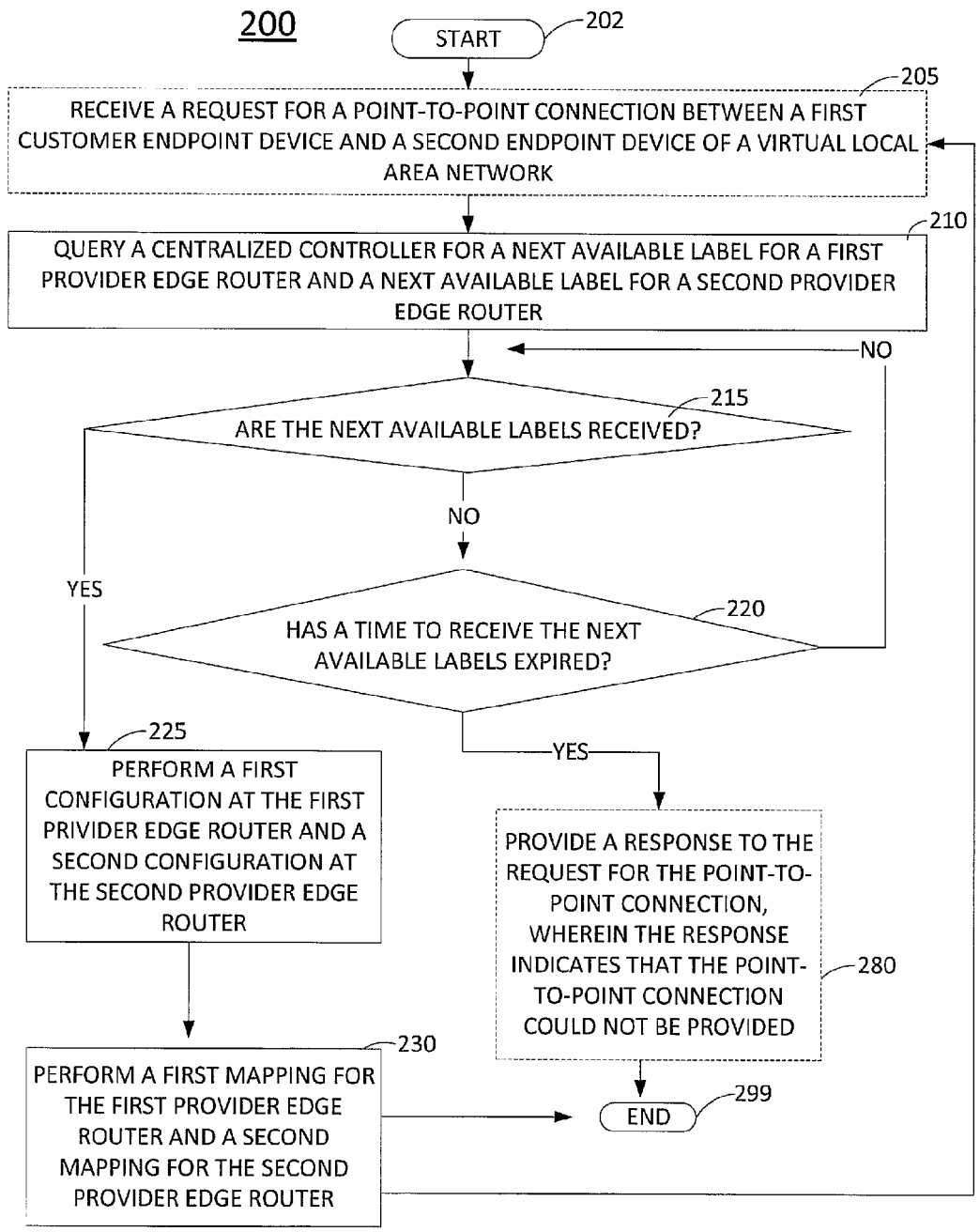
FIG. 2 illustrates a flowchart of an example method for providing a point-to-point connection between routers over a network.

FIG. 2 illustrates a flowchart of an example method 200 for providing a point-to-point connection between routers over a network in accordance with the present disclosure. In one embodiment, the method 200 may be implemented in a provisioning system 132, e.g., as a dedicated server for providing a point-to-point connection between routers or in the processor 302 as described in FIG. 3. In one embodiment, the method for providing the point-to-point connection may be implemented in a provisioning system 132 in accordance with the teachings of the present disclosure. The method 200 starts in step 202 and proceeds to step 205.

In optional step 205, the processor, receives a request for a point-to-point connection between a first customer endpoint device and a second endpoint device of a virtual local area network (VLAN). For example, the network service provider receives a customer subscription for a point-to-point connection between two customer endpoint devices of the customer via a virtual local area network (VLAN). The provisioning system of the service provider receives a request, e.g., from a personnel and/or a server of the service provider, for the point-to-point connection.

In step 210, the processor, queries a centralized controller for a next available label for a first provider edge router and a next available label for a second provider edge router, wherein a first interface and a second interface are deployed in the first provider edge router, wherein a third interface and a fourth interface are deployed in the second provider edge router, wherein the first customer endpoint device is connected to the first interface, wherein the second customer endpoint device is connected to the third interface. In one embodiment, the centralized controller is an SDN controller. For the example above, the SDN 133 is requested to provide the next available labels for PE routers 115 and 116 for supporting a point-to-point connection between CE 111 and CE 112 of customer A. For example, the first interface may be interface 117, the second interface may be interface 121, the third interface may be interface 118, and the fourth interface may be interface 122.

In step 215, the processor, determines whether the next available labels requested in step 210 are received. If the next available labels are received, the method proceeds to step 225. Otherwise, the method proceeds to step 220.

In step 220, the processor, determines whether a time to receive the next available labels from the centralized controller has expired. If the time to receive the next available labels as a response to the query has expired, the method proceeds to step 280. Otherwise, the method proceeds to step 215.

In step 225, the processor, performs a first configuration at the first provider edge router and a second configuration at the second provider edge router, wherein the performing the first configuration comprises configuring the first interface and configuring a virtual routing and forwarding label or a context label for using at least one tunnel by the second interface, wherein packets transmitted from the first customer endpoint device to the second endpoint device traverse the at least one tunnel via the second interface, wherein the performing the second configuration comprises configuring the third interface and configuring a virtual routing and forwarding label or a context label for using the at least one tunnel by the fourth interface, wherein packets transmitted from the second customer endpoint device to the first endpoint device traverse the at least one tunnel via the fourth interface. For the example above, the first configuration comprises configuring interface 117 and configuring a context label for using the tunnel 140 by interface 121. The tunnel 140 may then be used for forwarding traffic from interface 121 towards interface 122. Similarly, the second configuration comprises configuring interface 118 and configuring a context label for using the tunnel 140 by interface 122. The tunnel 140 may then be used for forwarding traffic from interface 122 towards interface 121.

In one embodiment, the configuring the virtual routing and forwarding label or the context label for using the at least one tunnel by the second interface comprises configuring a label range and an index into the label range for the first provider edge router, a label range and an index into the label range for the second provider edge router, a destination Internet Protocol address of the second provider edge router, and a resolved tunnel next-hop of the at least one tunnel for traversing a network from the second interface towards the fourth interface. In one embodiment, the configuring the virtual routing and forwarding label or the context label for using the at least one tunnel by the fourth interface comprises configuring a label range and an index into the label range for the second provider edge router, a label range and an index into the label range for the first provider edge router, a destination Internet Protocol address of the first provider edge router, and a resolved tunnel next-hop of the at least one tunnel for traversing a network from the fourth interface towards the second interface.

In one embodiment, performing the first configuration is performed in accordance with the next available label that is received for the first provider edge router, the next available label that is received for the second provider edge router, a destination Internet Protocol address of the second provider edge router, and a resolved tunnel next-hop of the at least one tunnel received for the first provider edge router. In one embodiment, performing the second configuration is performed in accordance with the next available label that is received for the second provider edge router, the next available label that is received for the first provider edge router, a destination Internet Protocol address of the first provider edge router, and a resolved tunnel next-hop of the at least one tunnel received for the second provider edge router. For the example of FIG. 1, the resolved tunnel next-hop to reach PE router 116 from PE router 115 may be provided as "Explicit Router (ERO) IP_address of PE router 116 [L1, L2, L3] outgoing-interface ID." Similarly, the resolved tunnel next-hop to reach PE router 115 may be provided to PE router 116.

To illustrate by way of example of FIG. 1, the configuring of the VRF label or context label, by the provisioning system in PE router 115 for tunnel 140 (or 141a), comprises configuring a label range and an index into the label range for the PE router 115, a label range and an index into the label range for the PE router 116, a destination IP address of the PE router 116, and the resolved tunnel next-hop to reach PE router 116 via the tunnel 140 (or 141a). The resolved tunnel next-hop to reach PE router 116 identifies interface 121 of PE router 115, which is used by packets traversing the tunnel, and a stack of labels for identifying a path traversed by the tunnel 140 (or 141a) through the network to reach interface 122 of PE router 116. That is, the path indicates how to get to the next-hop (e.g., PE router 116) through the network. For instance, the tunnel 140 or tunnel 141a traverses a path through the MPLS network using the stack of labels [L1, L2, L3] interface 121. Similarly, for PE router 116, the configuring the VRF label or context label comprises configuring a label range and an index into the label range for the PE router 116, a label range and an index into the label range for the PE router 115, a destination IP address of the PE router 115, and the resolved tunnel next-hop to reach interface 121 of PE router 115 via tunnel 140 (or 141b). For PE router 116, the resolved tunnel next-hop identifies the interface 122 of the PE router 116 which is used by packets traversing the tunnel 140 or 141b, and a stack of labels and outgoing interface 122 for identifying a path through the network to reach interface 121 of PE router 115.

In step 230, the processor, performs, a first mapping for the first provider edge router from the first interface to the second interface, and a second mapping for the second provider edge router from the third interface to the fourth interface. When the mapping is completed, the point-to-point connection is provided. The routing between the first and the second customer endpoint devices is then performed via the point-to-point connection. For example, a packet transmitted by CE 111 towards CE 112 may use interface 117, interface 121, tunnel 140 or 141a, interface 122, and interface 118. Similarly, a packet transmitted by CE 112 towards CE 111 may use interface 118, interface 122, tunnel 140 or 141b, interface 121, and interface 117. The advantages of routing without requiring signaling into the control plane are described above. The method then either returns to step 205, or to step 299 to end the process.

In optional step 280, the processor, provides a response to the request for the point-to-point connection, wherein the response indicates that the point-to-point connection could not be provided or is unavailable. The method then either returns to step 205, or to step 299 to end the process.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

In one embodiment, performing the first mapping and the second mapping in accordance with step 230 comprises mapping a single virtual local area network of a customer into the tunnel. For example, for each point-to-point connection of a customer, one tunnel is established and used.

In one embodiment, performing the first mapping and the second mapping in accordance with step 230 comprises aggregating a plurality of virtual local area networks from a plurality of ports into the tunnel. For the example illustrated in FIG. 1, the mapping aggregates VLAN 1 and VLAN 2 into tunnel 140. Note that VLANs 1 and 2 need not be mapped into the tunnel at the same time. For example, the service for customer B may be added after the tunnel has already been establish to provide service to customer A. Then, the step of establishing of the tunnel is already performed for customer B. The service for customer B will be turned up when the configuring of the interfaces (e.g., interfaces 119 and 120), the configuring of the VRF labels for customer B, and the mapping of the interfaces (e.g., interfaces 119 and 120) to the tunnel (e.g., tunnel 140) are completed.

In one embodiment, the PE router is a physical entity. For example, the destination IP address may be for a PE router that is located in a single physical device and is reachable via a unique IP address.

In another embodiment, the PE router is a virtual entity that resides within a physical entity. When the PE router is a virtual entity, referred to as VPE router, the tunnel is called the head-end tunnel. The head-end tunnel can anchor the customer VLANs under a logical interface (mode1) or operates as native IP packets under the logical interface (mode2). In mode 2, the first PE or the physical PE first strips the VLAN to expose the IP packets that are carried by the VLAN. For example, the source PE node may strip the VLAN tag from the customer interface before mapping the customer payload into a tunnel for traversing the service provider's network. When the payload reaches the remote VPE router (the destination), the payload is native IP packets which are anchored by the logical interface on the VPE and are ready to be processed and forwarded to the ultimate destination. In one embodiment, performing the first mapping and the second mapping in accordance with step 230 comprises stripping a tag of a virtual local area network to expose internet protocol packets that are carried within the virtual local area network, and placing the internet protocol packets into the context tunnel. The packets then traverse the network as IP packets within the MPLS context tunnel. The advantage of exposing the IP packets prior to the packets traversing the tunnel when the remote PE router is a virtual entity is described below. The virtual entity may be referred to as a VPE router. The VPE router may be described as a virtual router that a provisioning system spins up when traffic demand for a forwarding function increases, and spins down when traffic demand for the forwarding function decreases.

In one embodiment, when the PE router is a virtual entity, the present method enables the virtual entity to be duplicated to form any number of VPEs that are logically mapped to a share alias IP address. The forwarding function to be performed by the PE router may then be divided among the plurality of virtual VPE routers based on demand. The virtual VPE routers that share an logical alias IP address may be in different physical devices with unique IP address. The stack of labels to be used for reaching the various virtual VPE routers that share the same logical alias IP address will be different. When the IP packets are exposed by stripping the VLAN, load balancing across forwarders (virtual VPE routers) and hashing may be performed on the packets.

For an illustrative example, if there are three remote virtual PE routers VPE1, VPE2 and VPE3, a first stack of labels may be used for identifying a path through the network to reach VPE1, a second stack of labels may be used for identifying a path through the network to reach VPE2, and a third stack of labels may be used for identifying a path through the network to reach VPE3. Then, three resolved tunnel next-hops corresponding to three respective stacks of labels may be provided to the local PE router. For example, the resolved tunnel next-hops may be ERO Alias_IP_address of remote [L1, L2, L31], ERO Alias_IP_address of remote [L1, L2, L32], and ERO Alias_IP_address of remote [L1, L2, L33]. The Alias IP address is configured as the destination of the tunnel on the physical PE. The physical PE is configured to relegate the resolution of the tunnel destination which is the Alias IP to an SDN controller via protocols such as PCEP or BGP-LU or other methods. The SDN controller can translate the alias IP address of remote into three different IPs corresponding to VPE1, VPE2, VPE3 and corresponding stacks of labels. This results in the paths to be traversed through the service provider's network are not the same, as illustrated by the differences in the stack of labels.

In one embodiment, the resolved tunnel next-hop is given to the first and second provider edge routers statically. For example, the provisioning system may statically configure the first PE router with the resolved tunnel next-hop comprising: ERO IP_address of PE router 116 [L1, L2, L3] outgoing-interface 121. Similarly, the provisioning system may statically configure the second PE router with a resolved tunnel next-hop for reaching PE router 115.

In one embodiment, the resolved tunnel next-hop is recursively looked through the local routing table or forwarding table of first and second PEs. This is referred to as the local recursion method.

In one embodiment, the resolved tunnel next-hop is provided to the first and second PE routers via by a centralized controller, e.g., an SDN controller. For the virtual PE routers sharing an IP address, the traffic through the network may be monitored to determine if spinning up or down a PE router is needed.

In one embodiment, the resolved tunnel next-hop provided to the first and second PE routers is based on a time of day. For example, when more than one virtual PE router is performing the forwarding function towards the customer endpoint device, the control of which one of the virtual PE routers is performing the forwarding function at a given time may be provided by the SDN controller. The SDN controller may send, to a local PE router that communicates with a plurality of remote virtual PE routers, a resolved tunnel next-hop that comprises ERO IP_address of virtual PE router [L1, L2, L31] during a first time of day, a resolved tunnel next-hop that comprises ERO IP_address of virtual PE router [L1, L2, L32] during a second time of day, and so on. As indicated, the alias IP_address of the virtual VPE routers configured on the physical PE is used to map to a plurality of real IP address corresponding to the VPEs that have been instantiated or decommissioned under SDN control to meet traffic demands during different periods throughout the day. However, the stack of labels are different to load balance the traffic load to the instantiated VPEs.

In one example, the present method for providing a point-to-point connection between routers of the present disclosure is implemented via a dedicated database server. Furthermore, in one embodiment, the present method for providing a point-to-point connection between routers can be provided in the dedicated server, e.g., a provisioning system server 132, operated and managed by a network service provider. For example, the network service provider may operate one or more networks to provide one or more services such as telephony services, cellular services, data services (e.g., data access and transfer services, Internet access services, and the like), multimedia delivery services (e.g., multimedia programming delivery services such as movies, videos, music and the like), and the like.

As such, the present disclosure provides at least one advancement in the technical field of providing a point-to-point connection between routers. This advancement improves connectivity for point-to-point scenarios and enables a data channel connectivity to be maintained even when signaling channel is terminated or dropped.

FIG. 3 depicts a high-level block diagram of a computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for providing a point-to-point connection between routers, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or each of the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 305 for providing a point-to-point connection between routers (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for providing a point-to-point connection between routers (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
    querying, via a processor, a centralized controller for a next available label for a first provider edge router and a next available label for a second provider edge router, wherein a first interface and a second interface are deployed in the first provider edge router, wherein a third interface and a fourth interface are deployed in the second provider edge router, wherein a first customer endpoint device is connected to the first interface, wherein a second customer endpoint device is connected to the third interface;
    performing, via the processor, a first configuration at the first provider edge router and a second configuration at the second provider edge router, wherein the performing the first configuration comprises configuring the first interface and configuring a virtual routing and forwarding label or a context label for using at least one tunnel by the second interface, wherein packets transmitted from the first customer endpoint device to the second endpoint device traverse the at least one tunnel via the second interface, wherein the performing the second configuration comprises configuring the third interface and configuring a virtual routing and forwarding label or a context label for using the at least one tunnel by the fourth interface, wherein packets transmitted from the second customer endpoint device to the first endpoint device traverse the at least one tunnel via the fourth interface; and
    performing, via the processor, a first mapping for the first provider edge router from the first interface to the second interface, and a second mapping for the second provider edge router from the third interface to the fourth interface.

2. The method of claim 1, wherein the configuring the virtual routing and forwarding label or the context label for using the at least one tunnel by the second interface comprises configuring a label range and an index into the label range for the first provider edge router, a label range and an index into the label range for the second provider edge router, a destination internet protocol address of the second provider edge router, and a resolved tunnel next-hop of the at least one tunnel for traversing a network from the second interface towards the fourth interface.

3. The method of claim 1, wherein the configuring the virtual routing and forwarding label or the context label for using the at least one tunnel by the fourth interface comprises configuring a label range and an index into the label range for the second provider edge router, a label range and an index into the label range for the first provider edge router, a destination internet protocol address of the first provider edge router, and a resolved tunnel next-hop of the at least one tunnel for traversing a network from the fourth interface towards the second interface.

4. The method of claim 1, wherein the first configuration is performed in accordance with the next available label that is received for the first provider edge router, the next available label that is received for the second provider edge router, a destination internet protocol address of the second provider edge router, and a resolved tunnel next-hop of the at least one tunnel received for the first provider edge router.

5. The method of claim 1, wherein the second configuration is performed in accordance with the next available label that is received for the second provider edge router, the next available label that is received for the first provider edge router, a destination internet protocol address of the first provider edge router, and a resolved tunnel next-hop of the at least one tunnel received for the second provider edge router.

6. The method of claim 1, wherein the performing the first mapping is for mapping one virtual local area network into the at least one tunnel.

7. The method of claim 1, wherein the performing the second mapping is for mapping the one virtual local area network into the at least one tunnel.

8. The method of claim 1, wherein the performing the first mapping is for aggregating a plurality of virtual local area networks into the at least one tunnel.

9. The method of claim 1, wherein the performing the second mapping is for aggregating the plurality of virtual local area networks into the at least one tunnel.

10. The method of claim 1, wherein the performing the first mapping comprises stripping a label of a virtual local area network to expose internet protocol packets, and placing the internet protocol packets into the at least one tunnel.

11. The method of claim 1, wherein the performing the second mapping comprises stripping a label of a virtual local area network to expose internet protocol packets, and placing the internet protocol packets into the at least one tunnel.

12. The method of claim 1, wherein a resolved tunnel next-hop of the at least one tunnel is provided to the first provider edge router statically.

13. The method of claim 1, wherein a resolved tunnel next-hop of the at least one tunnel is provided to the second provider edge router statically.

14. The method of claim 1, wherein a resolved tunnel next-hop of the at least one tunnel is provided to the second provider edge router by recursively looking into a local routing or forwarding table of the first provider edge router.

15. The method of claim 1, wherein a resolved tunnel next-hop of the at least one tunnel is provided to the first provider edge router via the centralized controller, or wherein a resolved tunnel next-hop of the at least one tunnel is provided to the second first provider edge router via the centralized controller.

16. The method of claim 1, wherein a resolved tunnel next-hop of the at least one tunnel is determined based on a time of day and provided to the first provider edge router, or wherein a resolved tunnel next-hop of the at least one tunnel is determined based on a time of day and provided to the second provider edge router.

17. The method of claim 1, wherein the centralized controller comprises a software defined networking controller.

18. The method of claim 1, further comprising:
receiving a request for a point-to-point connection between the first customer endpoint device and the second endpoint device; and
providing a response to the request for the point-to-point connection, wherein the response indicates that the point-to-point connection is unavailable when a time to receive the next available label for the first provider edge router and the next available label for the second provider edge router from the centralized controller has expired and the next available label for the first provider edge router and the next available label for the second provider edge router are not received.

19. A non-transitory computer-readable storage device storing a plurality of instructions which, when executed by a processor, cause the processor to perform operations, the operations comprising:
querying a centralized controller for a next available label for a first provider edge router and a next available label for a second provider edge router, wherein a first interface and a second interface are deployed in the first provider edge router, wherein a third interface and a fourth interface are deployed in the second provider edge router, wherein a first customer endpoint device is connected to the first interface, wherein a second customer endpoint device is connected to the third interface;
performing a first configuration at the first provider edge router and a second configuration at the second provider edge router, wherein the performing the first configuration comprises configuring the first interface and configuring a virtual routing and forwarding label or a context label for using at least one tunnel by the second interface, wherein packets transmitted from the first customer endpoint device to the second endpoint device traverse the at least one tunnel via the second interface, wherein the performing the second configuration comprises configuring the third interface and configuring a virtual routing and forwarding label or a context label for using the at least one tunnel by the fourth interface, wherein packets transmitted from the second customer endpoint device to the first endpoint device traverse the at least one tunnel via the fourth interface; and
performing a first mapping for the first provider edge router from the first interface to the second interface, and a second mapping for the second provider edge router from the third interface to the fourth interface.

20. An apparatus comprising:
a processor; and
a computer-readable storage device storing a plurality of instructions which, when executed by the processor, cause the processor to perform operations, the operations comprising:
querying a centralized controller for a next available label for a first provider edge router and a next available label for a second provider edge router, wherein a first interface and a second interface are deployed in the first provider edge router, wherein a third interface and a fourth interface are deployed in the second provider edge router, wherein a first customer endpoint device is connected to the first interface, wherein a second customer endpoint device is connected to the third interface;
performing a first configuration at the first provider edge router and a second configuration at the second provider edge router, wherein the performing the first configuration comprises configuring the first interface and configuring a virtual routing and forwarding label or a context label for using at least one tunnel by the second interface, wherein packets transmitted from the first customer endpoint device to the second endpoint device traverse the at least one tunnel via the second interface, wherein the performing the second configuration comprises configuring the third interface and configuring a virtual routing and forwarding label or a context label for using the at least one tunnel by the fourth interface, wherein packets transmitted from the second customer endpoint device to the first endpoint device traverse the at least one tunnel via the fourth interface; and
performing a first mapping for the first provider edge router from the first interface to the second interface, and a second mapping for the second provider edge router from the third interface to the fourth interface.

* * * * *